(12) United States Patent
Geib (10) Patent No.: US 10,161,681 B2
(45) Date of Patent: Dec. 25, 2018

(54) MELTING PROCESS HAVING SHEATHING THAT CAN BE PUSHED THROUGH

(71) Applicant: Uwe Geib, Penzberg (DE)

(72) Inventor: Uwe Geib, Penzberg (DE)

(*) Notice: Subject to any disclaimer, the term of this patent is extended or adjusted under 35 U.S.C. 154(b) by 0 days.

(21) Appl. No.: 14/720,392

(22) Filed: May 22, 2015

(65) Prior Publication Data

US 2015/0253081 A1 Sep. 10, 2015

Related U.S. Application Data

(63) Continuation of application No. 13/638,697, filed as application No. PCT/EP2011/001574 on Mar. 29, 2011, now abandoned.

(30) Foreign Application Priority Data

Apr. 1, 2010 (DE) .................... 10 2010 013 664

(51) Int. Cl.
*F27D 1/16* (2006.01)
*C03B 3/00* (2006.01)
(Continued)

(52) U.S. Cl.
CPC ............. *F27D 1/1621* (2013.01); *C03B 3/00* (2013.01); *C03B 5/167* (2013.01); *C03B 5/43* (2013.01); *F27D 1/1678* (2013.01)

(58) Field of Classification Search
CPC ..... C03B 5/42; F27D 1/16; F27D 2001/1605; F27D 2001/161; F27D 2001/1615;
(Continued)

(56) References Cited

U.S. PATENT DOCUMENTS

| 1,707,374 A | 4/1929 | Greenleaf Turner et al. |
| 4,017,960 A * | 4/1977 | Kawabe ............... B01J 6/00 228/119 |

(Continued)

FOREIGN PATENT DOCUMENTS

| DE | 86467 | 12/1971 |
| DE | 4119993 | 12/1992 |

(Continued)

OTHER PUBLICATIONS

English Language Translation FR1156001A.*

(Continued)

*Primary Examiner* — Jason L Lazorcik
(74) *Attorney, Agent, or Firm* — Rankin, Hill & Clark LLP (57) ABSTRACT

The invention relates to methods and devices for melting furnaces, conveying paths and conveying means for the melt, the melt product and for any type of discharges from a melting furnace and transportation means for the melt, with an extended service life, which in the case of a complete screen, that is to say in the optimum situation, may also be infinite, and/or with increased purity of the melt. This is achieved by the pushing-through or rotating-through of screens, clinkers, coatings, linings, etc., that is to say solid materials which are situated between the melt or melt product or the discharges and the materials situated behind the same which counteract the pressure of the melt, of the melt product or the discharges, for example walls. Here, new pieces of the screens etc. may be added at one free end, and used or worn pieces of the screens can be removed or withdrawn at another free end.

9 Claims, 6 Drawing Sheets

(51) Int. Cl.
*C03B 5/167* (2006.01)
*C03B 5/43* (2006.01)

(58) Field of Classification Search
CPC ....... F27D 2001/005; F27D 2001/0066; F27D 2001/0053; F27D 2001/0083; F27D 2001/0086; F27D 2001/0089; F27D 2001/0096
See application file for complete search history.

(56) References Cited

U.S. PATENT DOCUMENTS

| | | | | |
|---|---|---|---|---|
| 4,452,749 | A * | 6/1984 | Kolvek | F27D 1/1621 202/270 |
| 4,920,899 | A * | 5/1990 | Blundy | F27B 14/02 110/336 |
| 5,254,001 | A * | 10/1993 | Frolich | C03B 5/42 432/247 |
| 2011/0019712 | A1 * | 1/2011 | Geib | C03B 5/42 373/27 |
| 2011/0180173 | A1 * | 7/2011 | Spies | C21B 7/12 138/111 |
| 2011/0192197 | A1 * | 8/2011 | Geib | C03B 5/04 65/27 |
| 2012/0222451 | A1 * | 9/2012 | Geib | C03B 5/42 65/125 |
| 2013/0157211 | A1 * | 6/2013 | Geib | C03B 5/42 432/11 |
| 2015/0063399 | A1 * | 3/2015 | Geib | C03B 3/00 373/30 |

FOREIGN PATENT DOCUMENTS

| | | | | |
|---|---|---|---|---|
| DE | 102008036790 A1 | | 2/2010 | |
| FR | 1156001 A | * | 5/1958 | .............. F23M 5/06 |
| JP | 8-52963 | | 3/1996 | |
| JP | 2001180951 A | * | 7/2001 | ........... C03B 17/062 |

OTHER PUBLICATIONS

Japanese Office Action with English Translation dated Jan. 13, 2015 from Japanese Patent Application No. 2013-501683, pp. 1-7.
English Translation of Eurasian Patent Examination Report dated Mar. 7, 2014, Application No. 201290997, pp. 1-2.
Examination Report dated May 12, 2016, German Application No. 10 2010 013 664.6, pp. 1-10 (including English translation).

* cited by examiner

MELTING PROCESS HAVING SHEATHING THAT CAN BE PUSHED THROUGH

CROSS-REFERENCE TO RELATED APPLICATIONS

This application is a continuation of U.S. application Ser. No. 13/638,697 filed Oct. 1, 2012, which is a U.S. National Stage application of PCT/EP2011/001574 filed Mar. 29, 2011, which claims priority to German Application No. 10 2010 013 664.6 filed Apr. 1, 2010, the entire disclosures of which are hereby incorporated by reference in their entireties.

The invention relates to methods and devices for melting furnaces, conveying paths and conveying means for the melt, the melt product and for any type of discharges from a melting furnace and transportation means for the melt, with an extended service life, which may also be infinite, and/or with increased purity of the melt. This is achieved by the pushing-through or rotating-through of screens, clinkers, coatings, linings, etc., that is to say solid materials which are situated between the melt or melt product or the discharges and the materials situated behind the same which counteract the pressure of the melt, of the melt product or the discharges and/or which isolate, surround or enclose the same with respect to the environment. Here, new parts, or already-used parts, of screens etc. may be added at one free end, and used or worn screens can be removed or withdrawn at another free end.

Previous equipment in the field of melting technology, for example glass melting, includes furnace systems or conveying paths for the melt, which are constructed from selected fire-resistant construction materials. In the simplest case, these are composed substantially of a base plate, the side walls and the arch, which together surround the furnace interior/melting chamber and thus the melt. In order to hold the individual components in their defined position and absorb the forces, which are considerable in some regions, substantial steel structures are required, which can be summarized under the term anchoring. The entire glass melting furnace is subjected to wear (corrosion/erosion) and therefore has a limited service life (furnace cycle). A repair of worn components is possible only to a limited extent without a shutdown and temperature withdrawal, and lengthens the furnace cycle of the melting furnace only to an insignificant extent. After a few years, the entire melting furnace must be completely renewed. Consideration is also being given to pushing through entire assemblies or parts of assemblies.

A melting furnace of said type is known inter alia from the as yet unpublished patent application DE 10 2008 050 855.

Said type of furnace construction has a short service life, is expensive and uneconomical in relation to modern mechanical components, data evaluation systems and regulating facilities.

The invention is therefore based on the object of specifying methods and devices which substantially extend the service life, reduce the expenditure of energy, increase the production rate and improve the purity of the product produced, that is to say result in fewer inputs of foreign bodies into the melt. In the optimum situation, all of these tasks are performed.

The object of the invention is achieved by means of the characterizing parts of the claims: method claims 1 to 5 and device claims 6 to 10.

The object of the invention, beginning with the mixing of the batch or with the supply of the basic material for the melting operation, that is to say the melt product, with the melting, for the further processing of the melt, also multi-layer melts, to the solidified end product or the discharges (residual materials) which have arisen during the melting, for example waste gases, slag etc., to the cooling of the discharges to ambient temperature, and for transportation means for the melt. The invention can be applied both to all furnace types, for example troughs, pots etc., and also to all meltable materials, for example for glass melts, for metal melts, mineral melts, etc., for single-material melts and also for multi-material melts and melt mixtures, etc. Screens, clinkers, coatings, linings, etc., that is to say components which are situated between the melt, melt product or discharges and the materials situated behind the same, for example walls, base, etc., which block or counteract the pressure or general forces of the melt, of the melt product or the discharges, are hereinafter referred to for simplicity as screen. Here, in general, the screens transmit the pressure or the forces to the external components, but have no significant supporting or counteracting function, that is to say if the screens were removed, the forces could be absorbed as before. In the case of coated materials which for example serve for constructing the furnace, these are components of the furnace.

All of FIGS. 1 to 8 may also be of rotated, turned and reversed construction, and likewise, the respective references to melt/melt product (15), melt level/bed height (16) and discharges (17), as are generally familiar to a person skilled in the art, are interchangeable and are therefore not imperatively subject to the references in FIGS. 1 to 8, wherein in the case of melt product, the melt level constitutes the bed height. The same applies to the different types of screen (6), that is to say endless screen (9), screen with retention device (10), guided screen (12), intermediate screen (13); these, too, may be interchanged in the figures. The virtually endless screen (9), which may likewise be constructed from pieces of screen (6.a), are for example rolls of screen material welded to one another. The specified movement directions (A, B, C) of the individual screen (6), virtually endless screen (9), screen with retention device (10), guided screen with guide device (11), guided screen (12) and intermediate screen (13), are not imperative; it is necessary merely to ensure that mutual hindrance during the movement/displacement/rotation/overlapping thereof is eliminated.

The exemplary embodiments of the invention will be explained by way of example on the basis of FIGS. 1 to 8, wherein each exemplary embodiment, as is generally familiar to a person skilled in the art, may be implemented beginning with the mixing of the batch or with the supply of the basic material for the melting operation, that is to say the melt product, with the melting, for the further processing of the melt, also multi-layer melts, to the solidified end product or the discharges (residual materials) which have arisen during the melting, for example waste gases, slag etc., to the cooling of the discharges to ambient temperature, and for transportation means for the melt.

In the figures:

FIG. 8 shows a detail of a section of an exchanger for energy exchange, having walls (2), discharge (17) and charge (18) and with screen (6) situated in between.

The object is achieved by means of claims 1 to 10 substantially in that the screen (6) or screens (6) can be pushed and/or rotated through the respective region while the respective region is performing its main function, for example during melting operation in the case of a melting furnace, such that at one side new or already used pieces of the screen can be added (7) and at another side the used, worn or tested pieces, or pieces which have been used for whatever other purpose, of the screen can be removed (8). A removal may also be a withdrawal. In this way, a continuous process of the executable main task of the respective region can be realized, or the process of the executable main task is not, or not significantly, hindered or disrupted by the specified measure, that is to say said process can remain at least substantially functional. In the optimum situation, there is a complete and therefore encircling layer of screen (6) that can be guided through or rotated through for all specified regions. The screen (6), in the different forms, such as for example pieces of the screen (6.a), virtually endless screen (9), screen with retention device (10), guided screen with guide device (11), guided screen (12), intermediate screen (13), in each case with or without passage opening (14), may each take on an adequate, technically expedient form. The respective exemplary embodiments are rendered more precisely in the subclaims. The control/regulation of the movement of the respective screen (6), or of the piece of the screen (6.a), in the different embodiments is realized by means of at least one data processing system or neuronal data system, in analog or digital form, which ensures the relevant data for displacement, rotation and the limitation of local forces and/or torques which arise. In this way, it is possible to allow for the physical characteristics of the material of the screen (6), or of the pieces of the screen (6.a), for example by virtue of the pressure required for pushing-through remaining below the limit of the maximum admissible pressure of the materials.

FIGS. 1 to 8, which will be explained below, show the method according to the invention as claimed in claims 1, 2 and 4, and the device as claimed in claims 6, 7, 8 and 9, in a plurality of preferred embodiments, designed such that the service life in said regions is lengthened considerably.

Figure 1:
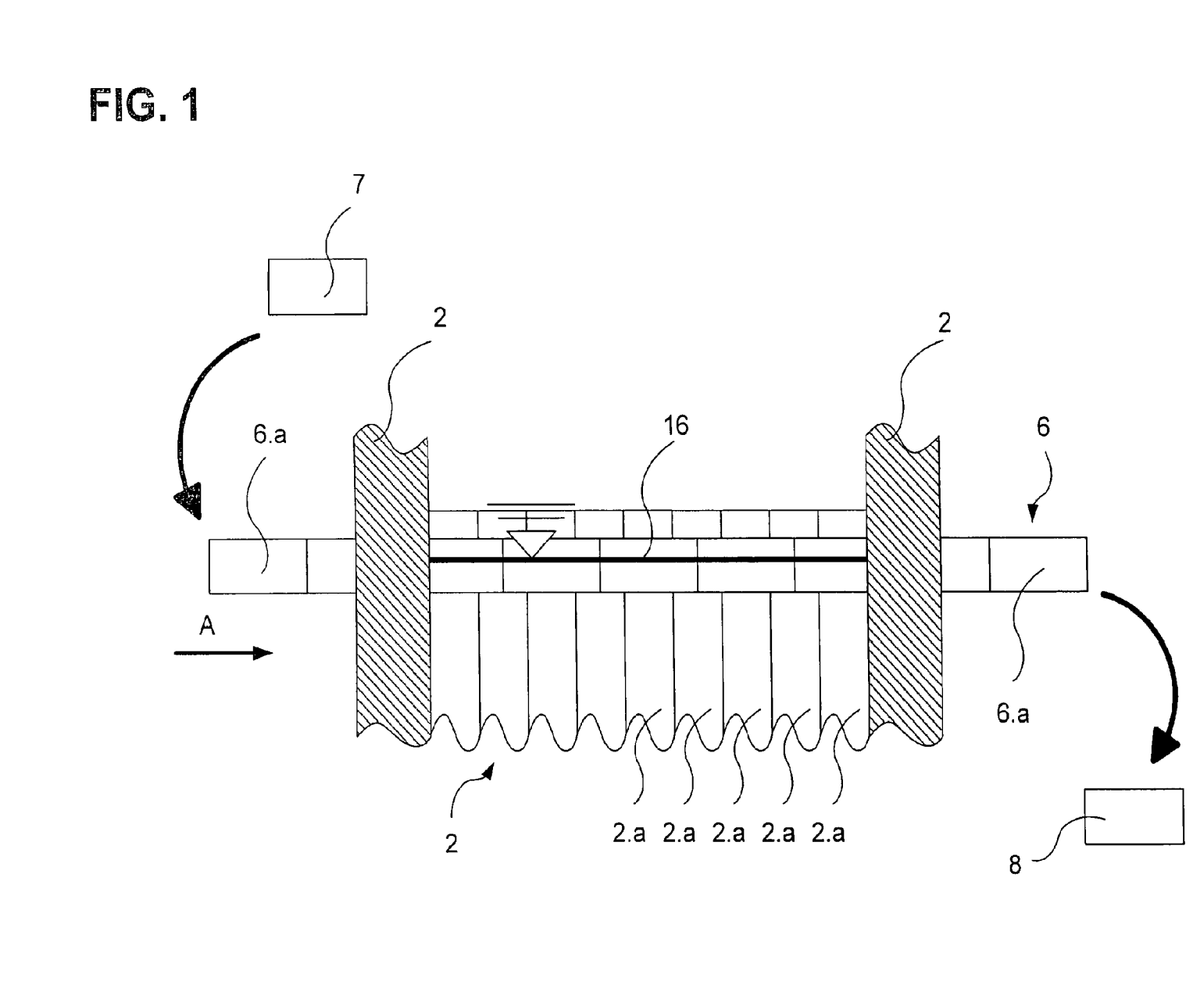
FIG. 1 shows a detail of a melting furnace, having delimiting walls (2) and having a screen (6) at the height of the melt level/bed height (16), composed of pieces of the screen (6.a), with an addition of one piece of the screen (7) and removal of one piece of the screen (8), with a linear movement direction (A) of the screen (6).

FIG. 1 shows, by way of example, a detail of a melting furnace in section. Here, the two walls (2) in the sectional illustration delimit the melting furnace. The wall (2), illustrated in plan view, composed of the pieces of the wall (2.a), is situated between the two walls (2) in the sectional illustration. At the height of the melt level/bed height (16) there is situated the screen (6), which in terms of its extent begins below the melt level/bed height (16) and extends to above the melt level/bed height (16) in order to counteract said critical region. The screen (6) is composed of a plurality of pieces of screen (6.a), which may be joined together or arranged in line. At one free end of the screen (6), pieces of the screen can be added (7), and at another free end of the screen (6), pieces of the screen can be removed (8). Here, the screen (6) performs a linear movement, movement direction (A).

Figure 2:
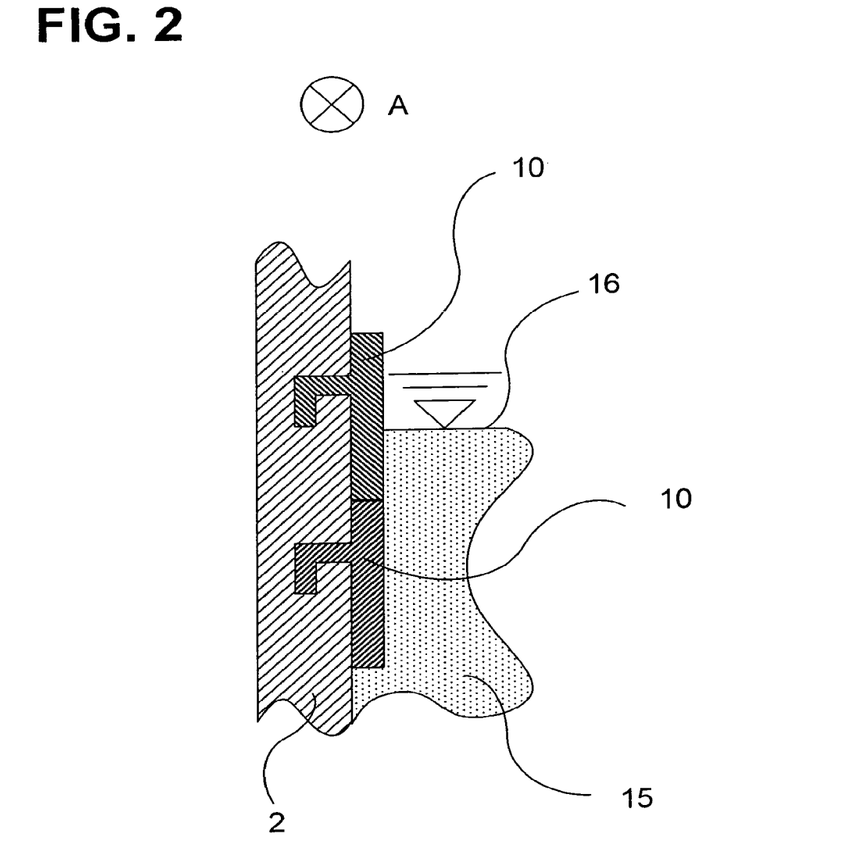
FIG. 2 shows a detail, in the form of a section, of a wall (2) with screens arranged one above the other with a retention device (10), and the melt/melt product (15).

FIG. 2 shows, by way of example, a detail of a melting furnace or of a conveying path in section, having a wall (2) in the sectional illustration, melt/melt product (15), and situated in between the screen with retention device (10), in a form in which a plurality of screens with retention device (10) are arranged one above the other. In this way, both displacements in the same direction and also displacements relative to one another are possible. Different movement speeds are also possible, for example in order to more quickly exchange regions which are more vulnerable. The melt level/bed height (16) shown is intended to illustrate this, wherein in the case of melt product, the melt level/bed height (16) constitutes the bed height. The screens with retention device (10) arranged one above the other, in this case with planar contact surfaces between one another, may likewise have overlaps, be in toothed engagement with one another, or have between one another a tongue-and-groove connection, dovetail connection or any conceivable loose or fixed connection familiar to a person skilled in the art. Here, the screen with retention device (10) performs a linear movement, in movement direction (A), into the plane of the drawing. FIG. 2 can likewise perform a rotational direction of movement (B).

Figure 3:
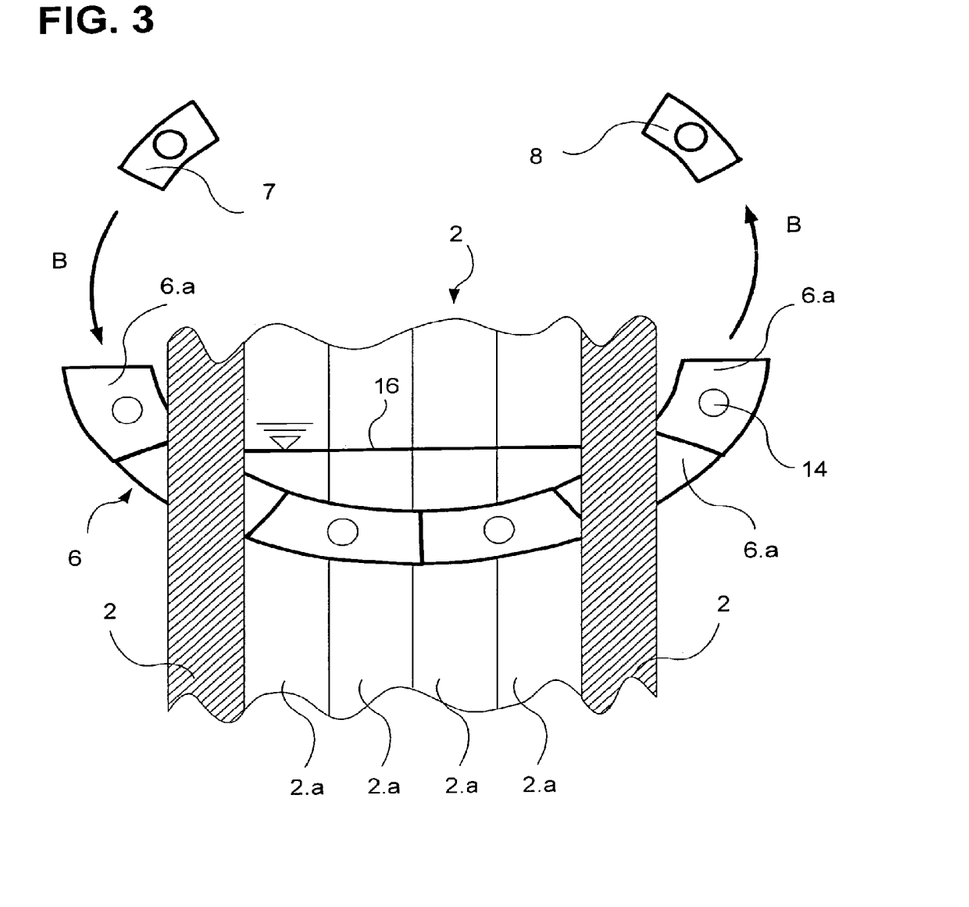
FIG. 3 shows a detail of a melting furnace, having delimiting walls (2) and having a screen (6) with a rotational movement direction (B), having in each case one passage opening (14) in the individual pieces of the screen (6.a), and with an addition of one piece of the screen (7) and removal of one piece of the screen (8).

FIG. 3 shows, by way of example, a detail of a melting furnace or of a conveying path in section. Here, the two walls (2) in the sectional illustration delimit the melting furnace. The wall (2), illustrated in plan view, composed of the pieces of the wall (2.a), is situated between the two walls (2) in the sectional illustration. Likewise illustrated is the addition of a piece of the screen (7) and the removal of a piece of the screen (8). The melt level/bed height (16) is shown by way of example. Here, the pieces of screen (6a) have in each case a passage opening (14) in order to lead through or for the passage of material flows such as melt/melt product (15) and/or discharges (17). The wall (2) situated behind the screen (6) is interrupted in said region or likewise has at least one passage opening. It is also possible for a plurality of passage openings (14) to be provided in one piece of the screen (6.a), which passage openings may have identical or different opening sizes and/or functions. Here, the screen (6) performs a rotational movement in movement direction (B). In FIG. 3, when viewed from above, the wall (2) in plan view may likewise be a base, wherein the passage openings (14) are then situated in the base; in this case, the melt level is irrelevant. This may be for example for the passage of melt in a melting furnace.

Figure 4:
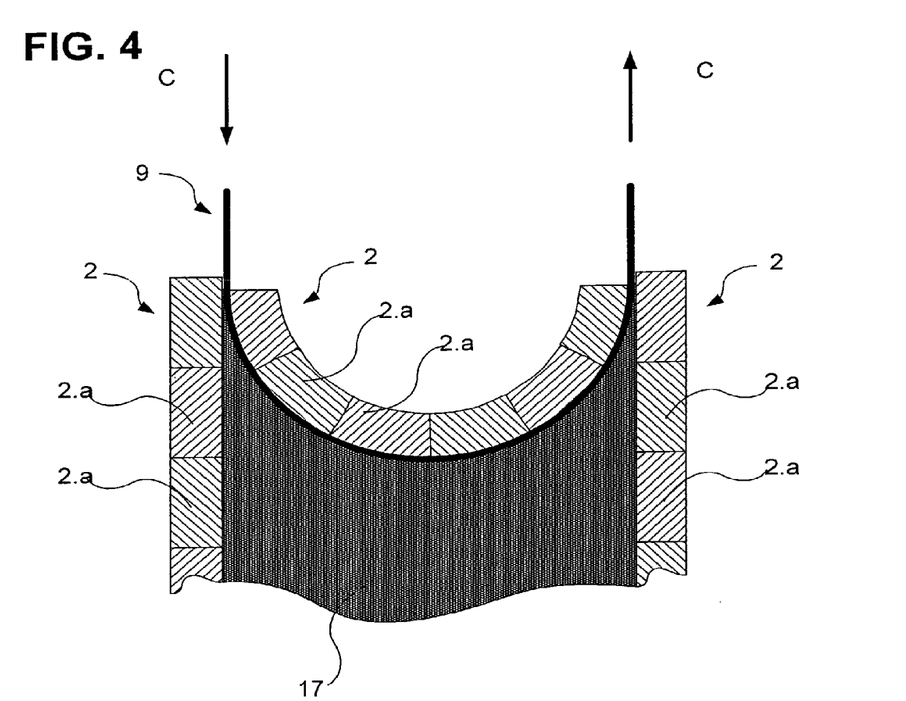
FIG. 4 shows a detail of a section for discharges (17), having the walls (2) and a virtually endless screen (9).

FIG. 4 shows, by way of example, a detail of a section through a conveying path for discharges (17), for example a waste gas duct, composed of the delimiting walls (2), in a form in which the screen (6) is illustrated as a virtually endless screen (9). Said virtually endless screen (9) may be realized for example by welding on new pieces of the screen (6.a), and likewise by means of continuous new follow-up melting of the material of the screen (6) in order to obtain a virtually endless screen (9). Here, the screen (9) performs a variable movement in a movement direction (C). In the view from above, FIG. 4 may likewise be considered for melt/melt product (15) instead of the discharges (17), in the form for example of a purifying region, homogenization region or the working trough.

Figure 5:
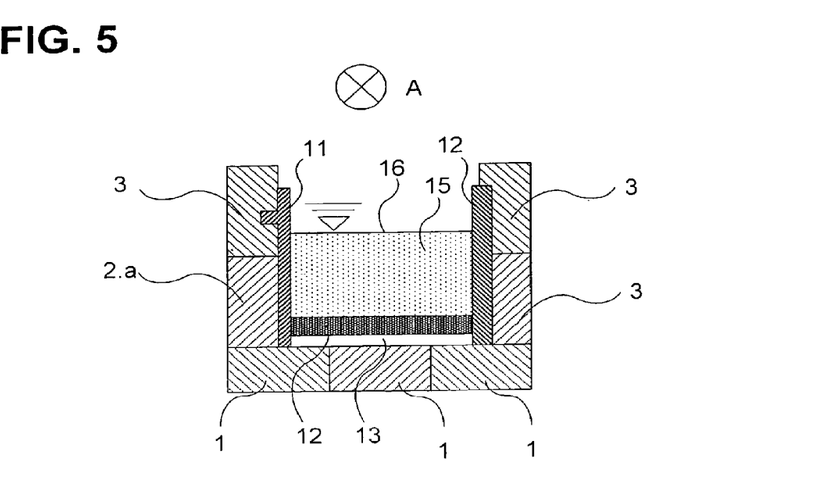
FIG. 5 shows a section of a conveying path for melt/melt product (15), having base pieces (1) and having the piece of the wall (2.a), the pieces of the wall with a cutout for screen (3), and situated therein the guided screen with guide device (11), guided screens (12) and intermediate screen (13).
Figure 6:
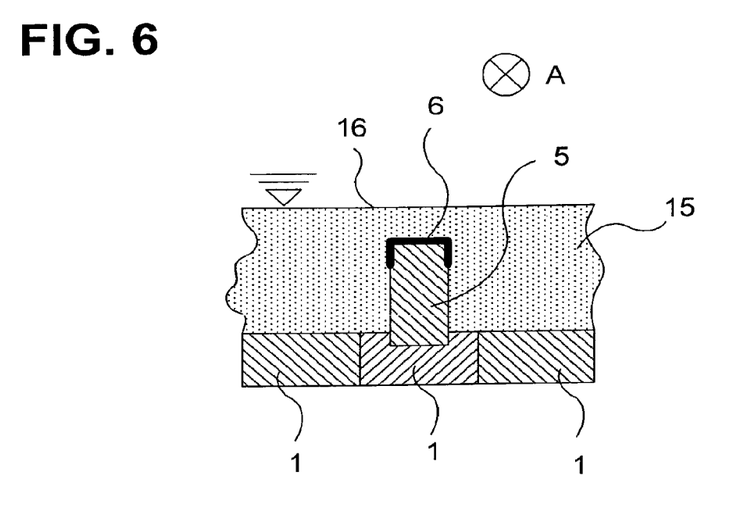
FIG. 6 shows a detail of a section, having base pieces (1) and having a barrier (5) for the melt/melt product (15) and the screen (6).

FIG. 5 shows, by way of example, a section through a conveying path for the melt/melt product (15), composed of the pieces of the base (1), the piece of the wall (2.a) and the pieces of the wall with a cutout for screen (3), which for example counteract the pressure of the melt/melt product (15). The different screen (6), screen with guide device (11), guided screen (12) and the intermediate screen (13) situated in between may also be pushed through without retention, possibly with guidance. The screen with guide device (11) is illustrated here with a peg, as a guide, pointing away from the melt/melt product (16). Said peg could also be a bead, elevation or depression, etc., or any guide familiar to a person skilled in the art. The lateral guided screen (12) is partially fitted into the piece of the wall with a cutout for screen (3); complete fitting-in, so as to form a plane, is also conceivable. By means of an offset of the components situated behind the same, or through the use of narrower components, it is also possible, instead of the individual pieces of the wall with a cutout for screen (3), to use individual pieces of the wall (2.a). An even deeper cutout into the piece of the wall with a cutout for screen (3), as compared with that illustrated, is possible. In this way, it is also possible to realize screens (6) pushed or rotated over one another or a combination of these, without the formation of a shoulder toward the melt/melt product (15), such that a plane continues to exist. The guided screen (12) situated between the melt/melt product (15) and the intermediate screen (13) is guided laterally by the guided screen with guide device (11) and the guided screen (12). The gravitational force of the melt/melt product (15) pushes the guided screen (12) downward from above, such that the guided screen (12) and likewise the intermediate screen (13) cannot float upward. In order, for example, to reduce the friction of the movement of a screen (6), an intermediate screen (13) may be placed in. Said intermediate screen (13) may also be composed of a plurality of layers, that is to say a plurality of layered intermediate screens (13), which may also be displaced or rotated at different speeds and/or in different directions of movement, and may likewise be constructed only from parts of intermediate screen (13), that is to say intermediate screen (13) not of large-area configuration, and/or screen (6), displacement rails, gas layers, insulating layers, sliding layers or any further type familiar to a person skilled in the art. Here, the guided screen with guide device (11), guided screen (12) and intermediate screen (13) perform a linear movement, in movement direction (A), into the plane of the drawing. FIG. 6 shows, by way of example, a detail of a section through a melting furnace. Here, a barrier (5), for example a wall, which in essence likewise constitutes a piece of the base (1), is integrated into a piece of the base (1). Said barrier (5) has a screen (6) which performs a linear movement in a movement direction (A) into the plane of the drawing. Such moderators which serve for varying for example the flow of the melt/melt product (15) are subjected to a high level of wear. In this case, the screen (6) is illustrated as a U-shape, though may also if required be in the form of a slotted tetragonal hollow profile or have the corresponding retention devices.

Figure 7:
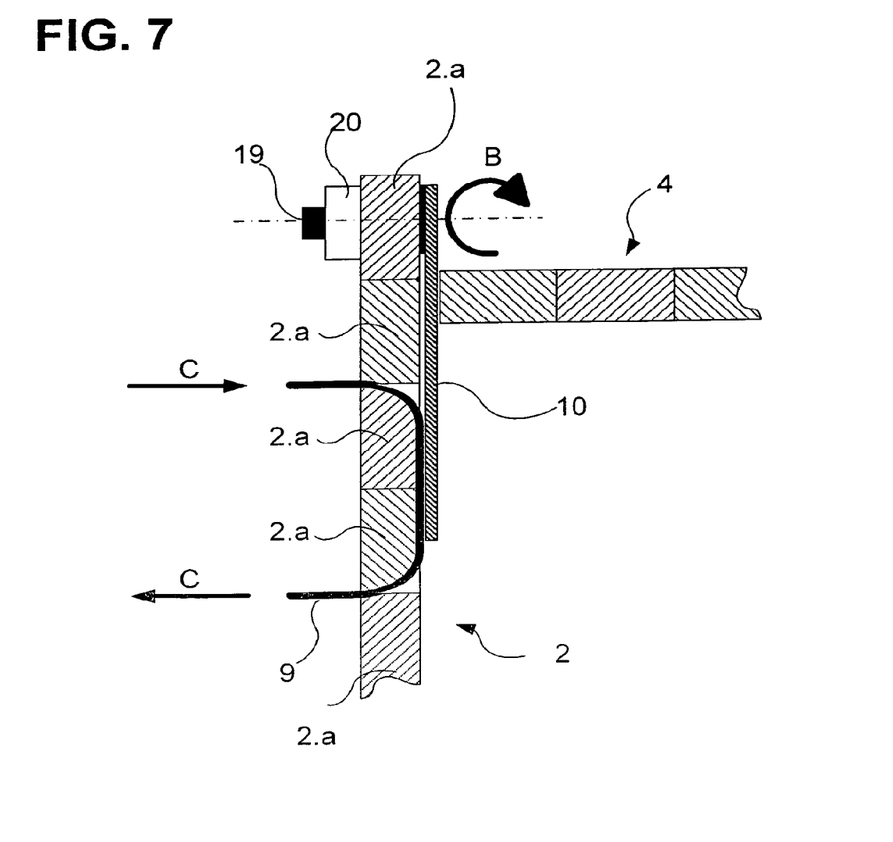
FIG. 7 shows a detail of a section of a melting furnace, having a wall (2) and cover/arch (4), having a virtually endless screen (9) in the wall (2) with a variable movement direction (C), and having a screen with retention device (10) and with a rotational movement direction (B), the retaining bolt (19) of which is situated outside the melting furnace.
Figure 8:
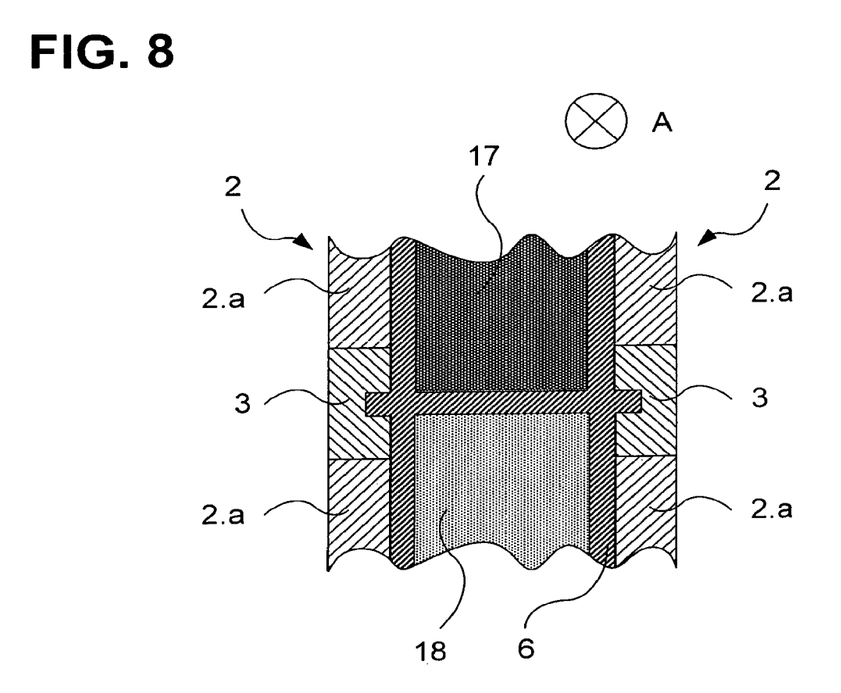

FIG. 7 shows, by way of example, a detail, in the form of a section, with pieces of the wall (2.a) and the cover/arch (4), with two different forms of movement of the screens, in this case overlapping. Whereas the screen (9) performs a variable movement in movement direction (C), the screen with retention device (10) performs a rotational movement in movement direction (B). Here, the retention device of the screen with retention device (10) is situated outside the hot zone, for example outside a melting furnace, and is held by the fixing (20) by means of the retention bolt (19). Here, the screen with retention device (10) rotates through a slot between the wall (2) and the cover/arch (4). The sealing may be realized both by means of the screen with retention device (10) and likewise by means of additional sealing measures known to a person skilled in the art. Here, the virtually endless screen (9) and the screen with retention device (10) overlap, wherein shaping and/or delimitation or closure of the passage opening (14) (not illustrated here) may be achieved in this way as well as by seals, additional insulation, for example by means of the virtually endless screen (9), or modifications of the flow of melt/melt product (15) or discharges (17). Here, the screen with retention device (10) illustrated in FIG. 7 may likewise be introduced, independently of a wall (2), merely for example through a slot in the cover/arch (4) into the upper furnace or else to the melt/melt product (15) in order to realize flows, temperature fields or further technical necessities. This is self-evidently not restricted to the cover/arch (4) but rather may also be realized in the base, the walls (2) or any other component, and also centrally in a component, for example the cover/arch (4), in order to realize delimitations of any conceivable type. The overlapping may also be an interweavement. FIG. 8 shows, by way of example, a detail, as a section, of an energy exchange, for example of a heat exchanger, composed of the walls (2), formed from the pieces of the wall (2.a) and the pieces of the wall with a cutout for a screen (3), in the cutout of which the screen (6) is situated, wherein the screen (6) constitutes the exchanger surface which delimits the material flows of discharges (17) and charges (18) from one another, such that an exchange of energy can take place without or virtually without material flow transfer. This may also be used for example for energy shielding. Here, the screen (6) performs a linear movement in movement direction (A) into the plane of the drawing.

It is self-evidently also conceivable for screens (6) to be able to be multiply mounted and/or pushed and/or rotated over one another and/or behind one another and/or into one another in order to realize certain shapes of the openings or passages, to ensure sealing actions, to reduce friction values or to obtain insulations. Here, the screens (6) need not be applied over the full area but rather may also be used in partial form. Here, it is also possible for openings or passages to be closed off, delimited or opened in order to prevent or limit material flows; in this context, a displacement back and forth or rotation back and forth would appear to be expedient. In the case of rotational movements of the screen (6), which generally describe a segment of a circle, a rotation over a full circle is conceivable, as is a pivoting movement. It is also conceivable that, in the case of a tube, for example the tube of a tube furnace or a circular waste gas duct for discharges (17), the screen (6) or the pieces of the screen (6.a) are rotated through the tube, in such a way that the rotational movement takes place in the manner of a thread in a nut. In the case of a screen (6) situated for example at the inside, a movement in the manner of a thread of a metric screw or conical screw or corkscrew is also conceivable. The screen (6) may also be composed of a plurality of pieces of the screen (6.*a*) in the form of a full circle, in such a way that pieces of the screen (6.*a*) can be removed or withdrawn and added at one location; here, the screen (6) may, at one point, be situated outside the region of the melt/melt product (15) or the discharges (17), or, in the melt/melt product (15) or the discharges (17), there is situated a chamber for the exchange of the pieces of the screen (6.*a*), or a mechanism automatically or fully automatically, in a regulated or controlled manner, removes or withdraws and replaces the exchange in the chamber or in the melt/melt product (15) or the discharges (17). This is self-evidently not restricted to a full circle but rather may also be applied to linear, rotational or variable displacements or rotations. It is furthermore conceivable that, by means of a displacement back and forth of screen (6), or of pieces of the screen (6.*a*) or an individual piece of the screen (6.*a*), in this way an opening situated behind the same can be delimited in terms of its cross section; for this purpose, the component behind the screen (6) or the piece of the screen (6.*a*) must be provided with an opening, or an opening is provided. In this way, it is possible for melt/melt product (15) or discharges (17) in the outflow or onward flow to be limited and influenced or even eliminated. In the case of a screen (6) over the full area, infinite usage of the respective region is conceivable. This applies in particular if the possibility of the exchange of components situated behind the same and which have a supporting and/or guiding function for the screen (6) are likewise exchangeable. Continuous pushing-through or rotating-through is self-evidently not necessary. The pushing-through or rotating-through may take place partially, and likewise cyclically or on the basis of time presets, randomly and also in a controlled or regulated manner, on the basis of previous tests, also automatic tests, for example by means of an examination of the previously pushed-through screen (6), and also during or in the process. Here, the testing may take place for example by means of non-destructive methods such as for example optical methods, thermography, x-rays, etc. by means of apparatuses or sensors. Pushing-through or rotating-through may also take place in such a way that pieces of screen (6.*a*) or virtually endless screen (9) are pushed through again multiple times, for example in the manner of a tank track, in this case possibly also by removal and insertion of sub-portions or pieces from and into the virtually endless screen (9). The speed of pushing-through or rotating-through of individual for example rows takes place at different speeds, or takes place in different directions of displacement, also of rows situated adjacent to one another. Pushing-in or rotating-in and pushing-back and rotating-back are also possible in order to ensure protection of the screens (6), melt/melt product (15) and discharges (17), for example in order to resolve jamming situations. In the case of a roll, a virtually endless screen (9), this may also consist in the length of the virtually endless screen (9) being longer than the demand for virtually endless screen (9) over the service life of the entire region or partial region of the system or the transportation means. Furthermore, the movement of the screen (6) is conceivable in linear, rotational or variable form, that is to say any type of displacement, also into the chamber. It is thus conceivable for undulating movements for example of screens (6), or partial pieces of the screen (6.*a*), on the base to likewise take place by virtue of the screens (6) being held on the base by the pressure of the melt/melt product (15). Said pressure is not imperatively necessary. The screen (6) may also be displaced back and forth in order to resolve jamming situations, for example after an identification of a pressure increase or force increase in the sliding mechanism or in order to attain further effects. This likewise applies to all regions. In the case of pieces of the screen (6.*a*) these may, lined up loosely or joined to one another, and with smooth or rough surfaces not only on the lining-up surfaces or joining surfaces, have depressions, elevations, bores, pins, shoulders, toothings or the like, and may likewise be connected to one another, for example by means of screws, welding, riveting or adhesive bonding, as is generally familiar to a person skilled in the art. Intermediate layers, connectors, intermediate connectors, also composed of different materials, are also conceivable. A connection between individual screens (6) is not imperatively necessary, and generally also undesirable, for example rows of screens (6) situated one above the other. Likewise, a modular design may be composed of a plurality of pieces of screen (6.*a*) which may also have intermediate pieces or the like between one another. Here, the screens (6) may have any technically expedient form, size, material, design, wall thickness and layers, and may be formed from for example individual components that can be lined up with/joined to one another, shaped components, or formed as a band or as panels. The screens (6) may also be provided, as joining strips, with different lengths in order for example to prevent jamming. Guide rails are also conceivable. Here, the screen (6), or pieces of the screen (6.*a*), have the necessary retention and/or movement device and/or guide device such that they can be pushed, pulled or rotated, moved back and forth or rotated back and forth or else a possible combination of these, for example pushed and pulled, likewise moved out of their plane, such that a displacement into the chamber is possible. All of said movement configurations may be realized by means of hydraulics, pneumatics, spindle drives, with and without a gear mechanism, etc., and also by means of gravitational force. Here, the retention and/or movement device and/or guide device should be adapted to the respective demands and may have any technically expedient type and number of connecting facilities, as is generally known to a person skilled in the art. Here, the retention and/or movement device and/or guide device may be formed directly into the pieces of the screen (6.*a*) or comprised in the shaping, and also joined to the intermediate element, wherein a retention device may be referred to, or be, not only a guide device or a movement device but in each case also as retention elements, guide elements and movement elements. The sealing with respect to the melt/melt product (15) or the discharges (17) need not imperatively be ensured, because in this way, it is also possible for influence to be exerted on further tasks, for example partial and temporary erecting of pieces of the screen (6.*a*) for flow manipulation, such as changes in the flow, thermal characteristics, mechanics or further physical or chemical influential variables of melt/melt product (15) or discharges (17), and the shaping of the components or apparatus situated behind the same. Sealing of the melt with respect to the supporting components may be realized with a screen (6) covering the full area, for example a trough which extends across the melt level (16). Sealing of the screen (6) may also be realized in that the, before the extraction of the pieces of the screen which are to be removed (8), are beforehand rotated, turned or pushed out of their direction of movement into a different direction, that is to say out of their plane, such that a possible degree of wear of the pieces of the screen which are to be removed (8), which can lead to leakage, or by means of the component or the components which is/are intended to produce the sealing action with the screen (6) or the piece of the screen (6.*a*), and which may also be subject to possible wear, ensures a reliable sealing action. Here, intermediate elements, or coatings, are self-evidently also conceivable as sealing material, and likewise, in the case of melts, partial cooling for solidification of the melt is conceivable. The new pieces of the screen (6.*a*) may be brought to temperature substantially or exclusively by means of the heat conduction of the respective previously introduced pieces of the screen (6.*a*) or modules; the temperature withdrawal can likewise take place independently. It is also conceivable for energy to be input by means of the screens, for example in order to preheat the melt/melt product (15) or in order to realize an exchange of energy between discharges (17) and charges (18), or in order to commence the melting process until the energy input for the melting process is complete, or the charges (18), or in the case of cooling, to also achieve converse effects or, in this way, to attain physical or chemical changes in the melt/melt product (15) or discharges (17). In the case of transfers of energy, for example recuperative processes, the exchange of energy between material flows, also gases, it is possible for the screens (6), or the pieces of the screen (6.*a*), or else merely intermediate elements, to also constitute with additional openings for throughflow into or through the intermediate elements, without components situated behind the same. In the case of a throughflow in the intermediate elements, a medium flows through the screen (6).

LIST OF REFERENCE SYMBOLS

1 Base piece
2 Wall
2.*a* Piece of the wall
3 Piece of the wall with cutout for screen
4 Cover/arch
5 Barrier
6 Screen
6.*a* Piece of the screen
7 Addition of a piece of the screen
8 Removal of a piece of the screen
9 Virtually infinite screen
10 Screen with retention device
11 Guided screen with guide device
12 Guided screen
13 Intermediate screen
14 Passage opening
15 Melt/melt product
16 Melt surface/bed height
17 Discharges
18 Charges
19 Retaining bolt
20 Fixing
A. Linear movement direction
B. Rotational movement direction
C. Variable movement direction

The invention claimed is:

1. A method for lining a melting furnace for heating a product, the method comprising:
positioning a lining between a wall of the melting furnace and a conveying path, wherein:
the conveying path is configured for transportation of the product through the melting furnace; and
the lining comprises a plurality of replaceable pieces;
pushing and/or rotating the lining through the melting furnace;
adding a first replaceable lining piece to a first free end of the lining; and
removing a second replaceable lining piece from a second free end of the lining, wherein the first free end and the second free end are located outside of the melting furnace, and wherein the first replaceable lining piece is added and the second replaceable lining piece is removed simultaneously with the product being heated.

2. The method of claim 1, further comprising overlapping the first replaceable lining piece with one of the plurality of replaceable pieces.

3. The method of claim 1, further comprising engaging the wall with a retention device of the first replaceable lining piece.

4. The method of claim 1, further comprising placing a guide device of the first replaceable lining piece into a cutout of the wall.

5. The method of claim 1, wherein the removing of the second replaceable lining piece removes a worn lining piece.

6. The method of claim 3, wherein the retention device moves in a rotational direction.

7. The method of claim 3, wherein the retention device is located outside the melting furnace, and wherein the retention device rotates through a slot between the wall and a cover.

8. The method of claim 3, further comprising engaging the wall with another retention device of the first replaceable lining piece, wherein the retention device and the another retention device are positioned one above the other.

9. The method of claim 1, wherein the melting furnace is positioned between the wall and an opposing wall.

* * * * *